UNITED STATES PATENT OFFICE.

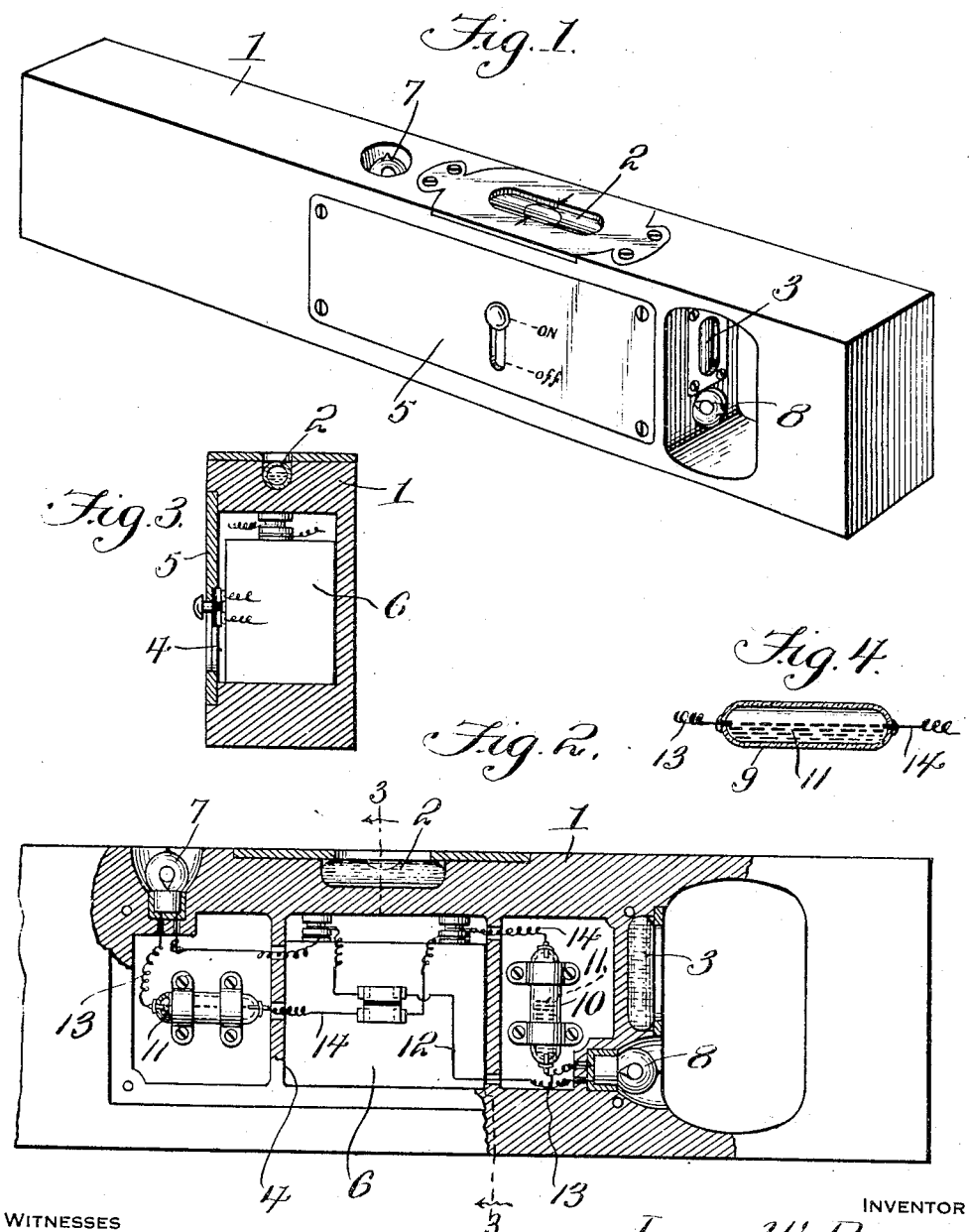

JESSE W. DAY, OF BEND, OREGON.

LEVEL OR PLUMB.

1,251,349.    Specification of Letters Patent.    Patented Dec. 25, 1917.

Application filed February 16, 1917. Serial No. 149,069.

*To all whom it may concern:*

Be it known that I, JESSE W. DAY, a citizen of the United States, residing at Bend, in the county of Deschutes and State of Oregon, have invented new and useful Improvements in Levels or Plumbs, of which the following is a specification.

This invention relates to an instrument of precision adapted to be used as a level or plumb and it consists in the novel features hereinafter described and claimed.

An object of the invention is to provide an instrument adapted to be used in dark places for ascertaining or determining a level or plumb vertical line, the said instrument also having features which may be used, if desired, for ascertaining such lines in bright light.

With these objects in view the instrument comprises a body having spirit tubes embedded therein and which are disposed at right angles with relation to each other. The bubbles in these tubes may be used for ascertaining lines above indicated when the instrument is used in the light and they in fact are of the usual arrangement. The body is further provided with a compartment normally closed by a plate and a battery is located in the said compartment. Tubes are located in the said compartment and are disposed at right angles with relation to each other. These tubes contain mercury. The ends of the said tubes are connected by means of wires with the battery and with bulbs embedded in the body and which are adapted to be illuminated by the current from the battery when the mercury contained in either one of the tubes comes in contact with the ends of the wires at the opposite ends of the tube.

In the accompanying drawing:—

Figure 1 is a perspective view of the level or plumb.

Fig. 2 is a fragmentary side elevation of the same with parts in section.

Fig. 3 is a transverse sectional view of the same cut on the line 3—3 of Fig. 2.

Fig. 4 is a longitudinal sectional view of a tube used in the plumb.

The level or plumb comprises a body 1 which is rectangular in form and may be of wood or any other suitable material. Spirit tubes 2 and 3 are embedded in the body 1 and disposed at right angles with relation to each other. The liquid in these tubes may be observed for determining a level or plumb line when the instrument is used in a light in the usual manner. The body 1 is provided with a compartment 4 which is normally closed by a metallic plate 5. A battery 6 is located in the compartment 4 and bulbs 7 and 8 are embedded in the body 1 adjacent the tubes 2 and 3 respectively. Tubes 9 and 10 are located in the compartment 4 and are arranged with long dimensions at right angles to each other. The said tubes 9 and 10 contain mercury indicated at 11. Wires 12 connect the battery 6 with the bulbs 7 and 8 and wires 13 connect the said bulbs with one end of the tubes 9 and 10. Wires 14 connect the other ends of the said tubes 9 and 10 with the battery 6. The end portions of the wires 13 and 14 which are connected with the tubes 9 and 10 extend into the same and they have contact with the mercury 11 when the level of the surface of the mercury is in alinement with the ends of the wires at the opposite ends of the tubes.

Assuming that the device is used for determining a level line the base surface of the body 1 is placed upon the object or upon a support and when the mercury in the tube assumes a level and its surface is in contact with the ends of the wires 13 and 14 which connect with the said tube, the circuit is completed from the battery 6 to the bulb 7 and hence the said bulb is illuminated and the observer knows that the upper and lower surfaces of the body 1 are on level lines.

To determine a plumb line one of the upper or lower surfaces of the body 1 is placed against the object or they are disposed in an upward direction and as soon as they are in plumb vertical line the mercury in the tube 11 contacts with the connecting wires and completes the circuit to the bulb 8.

When the bulb 8 is illuminated the observer knows that the sides of the body 1 are in vertical or plumb lines or planes.

From the above description taken in conjunction with the accompanying drawing, it will be seen that an instrument of simple and durable structure is provided and that the same may be easily and conveniently used in dark places for determining level or plumb vertical lines and that the instrument may also be used in bright light for determining such line by being manipulated in the usual manner.

Having described the invention what is claimed is:—

An instrument comprising an elongated body provided with a compartment, a battery located in the compartment, bulbs embedded in the body at different surfaces thereof, tubes located in the compartment and arranged at right angles to each other and containing mercury, wires connecting the battery with the tubes and the bulbs, respectively, the wires which connect with the tubes having their ends in the path of movement of the mercury in the tubes, the mercury in one tube adapted to close the circuit through its wires only when the body is horizontal, and that in the other tube adapted to close the circuit through its wires only when the body is vertical.

In testimony whereof I affix my signature.

JESSE W. DAY.

Copies of this patent may be obtained for five cents each, by addressing the "Commissioner of Patents. Washington, D. C."